April 5, 1966 G. E. DIEDRICH 3,244,601
FLUTED TUBULAR DISTILLATION APPARATUS
Filed Dec. 4, 1962
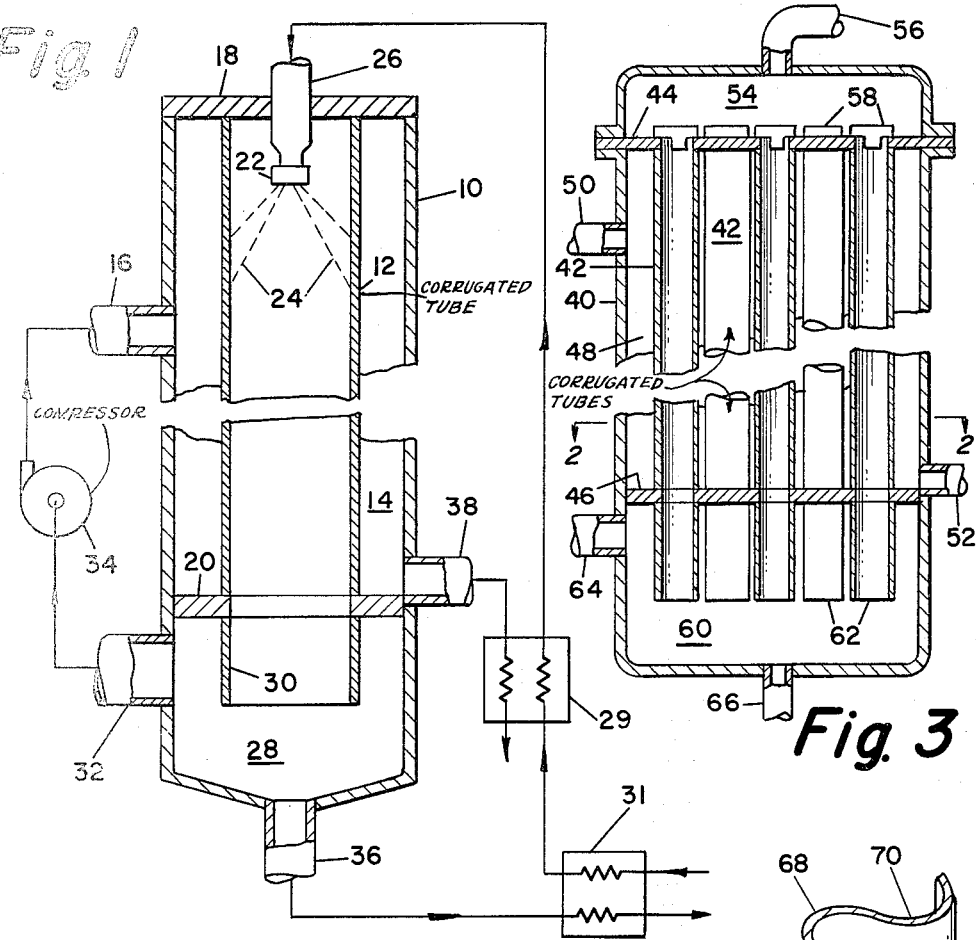
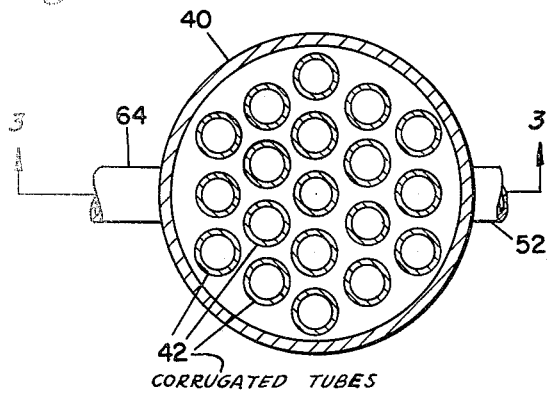
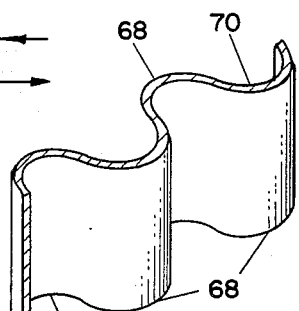
INVENTOR.
GUNTHER E. DIEDRICH
BY R H Quist
ATTORNEY

United States Patent Office 3,244,601
Patented Apr. 5, 1966

3,244,601
FLUTED TUBULAR DISTILLATION APPARATUS
Gunther Ernst Diedrich, Burlington, Vt., assignor to General Electric Company, a corporation of New York
Filed Dec. 4, 1962, Ser. No. 242,184
7 Claims. (Cl. 202—236)

This invention relates generally to saline water distillation apparatus and more particularly, to an improved vertical tube saline water still.

Arbitrarily, water is considered to be "saline" when it contains 1000 or more parts of salt per million parts of water, while it is considered to be fresh when it has fewer than 1000 parts per million of salt. Sea water contains about 35,000 parts per million of salt.

The increasing demand for fresh water in many areas of the world has given impetus to investigations for ways of converting saline water into fresh water in a manner which can be economically justified. One well known process for obtaining fresh water from saline water is distillation, which may be performed by bringing the saline water or distilland into contact with a heated surface in order to evaporate the water and leave the dissolved salts behind, and then condensing the vapors which are produced upon a relatively cool surface to form fresh water.

In the vertical tube still, the distilland is passed down through a plurality of tubes while steam is simultaneously applied to the outer surface of the tubes. Heat passes through the walls of the tubes to the distilland causing a portion of it to vaporize. The vapors which are produced are then separated from the now concentrated distilland or brine and condensed as fresh water.

Much research has been devoted to methods of increasing the heat transferred to the distilland from the condensing steam. It is known that moving the distilland rapidly over the inside wall of the tube produces a "scrubbing" action which improves the rate of heat transfer. The high velocities required for this approach have been achieved in the past by using a 24 foot tube having a 2½ inch diameter. As steam is generated in such a tube, the small volume causes an increased pressure which is relieved by the steam rushing down the tube. The longer the tube, the greater the resulting velocity. This rapid flow of steam aids the force of gravity in accelerating the distilland down the tube. By this method, heat transfer values of 1200 B.t.u./hr. sq. ft., ° F. have been obtained, although as time passes, this value drops due to the build up of scale in the tube. Moreover, it is evident that a still having 24 foot tubes will be so high that it becomes difficult to install it in a building or on a ship, particularly when the need for replacing the tubes is considered.

It is, therefore, an object of this invention to provide a vertical tube still in which high rates of heat transfer can be achieved although the tubes remain relatively short.

In carrying out the invention in one form, a tube having a wall formed with a series of parallel protuberances separated by depressions is mounted vertically in a heat insulated jacket. The jacket forms an annular chamber about the tube into which steam can be admitted. Distilland is sprayed onto the interior wall of the tube near its top. The steam on the outside of the tube causes a portion of this distilland to evaporate while the remainder continues down to the bottom of the tube. A separation chamber located below the tube permits the vapor to be drawn off by a vapor compressor while the brine is piped to a heat exchanger. The vapor compressor increases the pressure of the vapor before pumping it to the annular chamber surrounding the tube. The particular construction of the wall of the tube, in addition to the velocity of the distilland flowing down the tube, results in heat being transferred at the rate of up to 4200 B.t.u./hr. sq. ft., ° F. Under sustained operation, it has been possible to achieve rates of 3000 B.t.u./hr. sq. ft., ° F.

The invention will be better understood from the following description taken in connection with the accompanying drawing in which:

FIGURE 1 is an elevation of a single vertical tube still shown in cross-section;
FIGURE 2 is a plan view of a multiple vertical tube still shown in cross-section;
FIGURE 3 is an elevation of the multiple vertical tube still of FIGURE 2 shown in cross-section; and
FIGURE 4 is an isometric detail of the heat transfer wall used in this invention.

Referring to FIGURE 1, container 10 is shown enclosing tube 12 which constitutes an evaporating chamber. Tube 12 has a wall designed to facilitate heat transfer in a manner to be described later. Annular condensing chamber 14 between tube 12 and container 10 is designed to be filled with compressed vaporized distilland or steam from another source through inlet pipe 6. Top cover 18 and partition 20 complete condensing chamber 14.

Top cover 18 also serves to seal the upper end of tube 12 from the ambient air so that a desired pressure can be maintained in tube 12. Nozzle 22, positioned near the upper end of tube 12, sprays distilland on the inside wall of tube 12. Nozzle 22 is a type WR manufactured by Delavan Manufacturing Company which produces a hollow cone spray as is indicated by broken lines 24. These nozzles are available in a number of different sizes and cone angles. It has been found preferable to spray distilland on the wall of tube 12 with a downward velocity component. A nozzle having a cone angle of 72 degrees has produced excellent results.

Distilland is delivered to nozzle 22 by pipe 26, ordinarily after being heated, for example by heat exchangers 29 and 31. The construction of the wall of tube 12, aided by the velocity of the distilland, results in heat being transferred from the vapors in condensing chamber 14 to the distilland in tube 12 causing a portion of the distilland to evaporate. These vapors, together with the remaining, unevaporated distilland, flow down into separating chamber 28. Separator 30 positioned in separating chamber 28 permits the vapors to be drawn off through pipe 32 to vapor compressor 34. The unevaporated distilland is removed from separating chamber 28 through pipe 36, and may be passed through heat exchanger 31 before being discharged or sent for further processing.

Vapor compressor 34 is designed to add energy to the evaporated distilland by increasing its pressure and temperature. This additional energy is needed so that a temperature difference across the wall of tube 12 will be maintained and heat will be transferred through this wall to the distilland. An alternative method of supplying the necessary additional energy would be through the use of a conventional superheater or the like.

As heat is removed from the evaporated distilland in condensing chamber 14, the vapors condense, producing the distillate which is the desired end product of the still. The distillate is removed from condensing chamber 14 through pipe 38 and may be conveyed to heat exchanger 29 to add heat to incoming distilland.

Although not shown in FIGURE 1 for the purpose of clarity, heat insulating material would be provided to cover the outer wall of container 10 so as to prevent excessive loss of heat to the ambient air.

In constructing the apparatus shown in FIGURE 1, tube 12 was made 5 feet long and had a 3 inch diameter; however, tubes from 4 to 7 feet long and from 2½ to 6 inches in diameter would appear to be satisfactory. Distilland (sea water) was delivered to nozzle 22 at a pressure of about 30 pounds per square inch gage, a temperature of about 185° F., and at a rate of 1½ gallons per minute. With a temperature difference between condensing chamber 14 and the evaporating chamber of tube 12 of about 10 F. degrees, one gallon of distillate having 4 parts per million of salt or less is achieved from 3 or 4 gallons of distilland.

Referring next to FIGURES 2 and 3, a multiple vertical tube still constructed in accordance with the invention will be described. Container 40 is shown enclosing a plurality of similar tubes 42, each of which constitutes an evaporating chamber. Container 40, together with upper and lower partitions 44 and 46 respectively, defines a condensing chamber 48 in which tubes 42 are disposed.

Compressed vaporized distilland or steam is supplied to condensing chamber 48 through inlet pipe 50, while distillate is removed from this chamber through pipe 52.

Distilland is admitted to distribution compartment 54 through pipe 56 at an elevated pressure. Spray nozzles 58 are positioned at the top of each tube 42 to spray distilland on the inside walls of these tubes as described in connection with FIGURE 1.

The presence of the compressed vaporized distilland in condensing chamber 48 causes some of the distilland in tubes 42 to be evaporated. The evaporated distilland together with the remaining unevaporated distilland flows down tubes 42 to separating chamber 60. Separators 62 positioned in separating chamber 60 permit the evaporated distilland to be drawn off through pipe 64, while the unevaporated distilland is removed through pipe 66.

The walls of tubes 42 and the wall of tube 12 in FIGURE 1 are designed to facilitate heat transfer by their particular construction as will now be described in connection with FIGURE 4. The tubes are preferably formed of a material having good heat transfer characteristics, such as copper or aluminum, which is corrugated so that each surface consists of a plurality of elongated parallel protuberances 68 separated by depressions 70. Condensing vapors tend to collect in depressions 70, although condensation occurs over the crests of protuberances as well. Distilland also tends to collect in depressions 70, but on the opposite surface of the wall. The boiling of the distilland due to heat transfer through the wall from the condensing surface tends to spread distilland from depressions 70 over the crests of protuberances 68. In the distillation apparatus of this invention, the tube would be formed so that protuberances 68 are substantially parallel with the longitudinal axis of the tube. A more detailed description of these heat transfer walls can be found in the United States patent application entitled, "Distillation Apparatus," filed March 1, 1962, and having Serial No. 176,711 now abandoned.

While particular embodiments of a vertical tube distillation apparatus have been shown and described, it will be obvious that changes and modifications can be made without departing from the spirit of the invention and the scope of the appended claims.

What is claimed as new and desired to be secured by Letters Patent of the United States is:

1. Distillation apparatus comprising:
   an elongated tube constituting an evaporating chamber,
   said tube having interior and exterior surfaces comprising a plurality of parallel protuberances separated by depressions,
   said protuberances being substantially parallel to the longitudinal axis of said tube,
   means for sealing said evaporating chamber from the ambient air at its upper end,
   nozzle means for spraying with a downward velocity component distilland on the wall of said evaporating chamber,
   a separating chamber positioned below said evaporating chamber,
   means located in said separating chamber to separate evaporated distilland from unevaporated distilland,
   means for removing evaporated distilland from said separating chamber,
   means for removing unevaporated distilland from said separating chamber,
   a container forming a sealed chamber surrounding said tube constituting a condensing chamber,
   means for admitting a supply of steam to said condensing chamber, and
   means for removing condensate from said condensing chamber.

2. Distillation apparatus comprising:
   an elongated tube constituting an evaporating chamber,
   said tube having interior and exterior surfaces comprising a plurality of parallel protuberances separated by depressions,
   said protuberances being substantially parallel to the longitudinal axis of said tube,
   means for sealing said evaporating chamber from the ambient air at its upper end,
   nozzle means for spraying with a downward velocity component distilland on the wall of said evaporating chamber,
   a separating chamber positioned below said evaporating chamber,
   means located in said separating chamber to separate evaporated distilland from unevaporated distilland,
   means for removing unevaporated distilland from said separating chamber,
   means for removing evaporated distilland from said separating chamber,
   means for adding energy to said evaporated distilland,
   a container forming a sealed chamber surrounding said tube constituting a condensing chamber,
   means for conveying said evaporated distilland from said energy adding means to said condensing chamber, and
   means for removing condensate from said condensing chamber.

3. Distillation apparatus comprising:
   a plurality of elongated tubes constituting evaporating chambers,
   each of said tubes having interior and exterior surfaces comprising a plurality of parallel protuberances separated by depressions,
   said protuberances being substantially parallel to the longitudinal axis of said tubes,
   a distilland distribution compartment positioned above the upper ends of said tubes,
   nozzle means for spraying with a downward velocity component distilland from said distribtuion compartment on the walls of said evaporating chambers.
   a separating chamber positioned below said evaporating chambers,
   means located in said separating chamber to separate evaporated distilland from unevaporated distilland,
   means for removing unevaporated distilland from said separating chamber,
   means for removing evaporated distilland from said separating chamber,
   means for adding energy to said evaporated distilled,
   a container forming a sealed chamber surrounding said tubes constituting a condensing chamber,
   means for conveying said evaporated distilland from said energy adding means to said condensing chamber, and
   means for removing condensate from said condensing chamber.

4. Distillation apparatus comprising:
   a plurality of elongated tubes constituting evaporating chambers,
   each of said tubes having interior and exterior surfaces comprising a plurality of parallel protuberances separated by depressions, said protuberances being substantially parallel to the longitudinal axis of said tubes, a distilland distribtuion compartment positioned above the upper ends of said tubes, nozzle means for spraying with a downward velocity component distilland from said distribution compartment on the walls of said evaporating chambers, a separating chamber positioned below said evaporating chambers, means located in said separating chamber to separate evaporated distilland from unevaporated distilland, means for removing unevaporated distilland from said separating chamber, means for removing evaporated distilland from said separating chamber, a container forming a sealed chamber surrounding said tubes constituing a condensing chamber, means for admitting a supply of steam to said condensing chamber, and means for removing condensate from said condensing chamber.

5. Distillation apparatus comprising:

a tube from 4 to 7 feet long and from 2½ to 6 inches in diameter constituting an exaporating chamber, said tube having interior and exterior surfaces comprising a plurality of parallel protuberances separated by despressions, said protuberances being substantially parallel to the longitudinal axis of said tube, means for sealing said evaporating chamber from the ambient air at its upper end, nozzle means for spraying with a downward velocity component distilland on the wall of said evaporating chamber, a separating chamber positioned below said evaporating chamber, means located in said separating chamber to separate evaporated distilland from unevaporated distilland, means for removing evaporated distilland from said separating chamber, means for removing unevaporated distilland from said separating chamber, a container forming a sealed chamber surrounding said tube constituting a condensing chamber, means for admitting a supply of steam to said condensing chamber, and means for removing condensate from said condensing chamber.

6. Distillation apparatus comprising:

a plurality of tubes of a substantially equal length of from 4 to 7 feet and a diameter of from 2½ to 6 inches constituting evaporating chambers, each of said tubes having interior and exterior surfaces comprising a plurality of parallel protuberances separated by depressions, said protuberances being substantially parallel to the longitudinal axis of said tubes, a distilland distribution compartment positioned above the upper ends of said tubes, nozzle means for spraying with a downward velocity component distilland from said distribution compartment on the walls of said evaporating chambers, a separating chamber positioned below said evaporating chambers, means located in said separating chamber to separate evaporated distilland from unevaporated distilland, means for removing unevaporated distilland from said separating chamber, means for removing evaporated distilland from said separating chamber, means for adding energy to said evaporated distilland, a container forming a sealed chamber surrounding said tubes constituting a condensing chamber, means for conveying said evaporated distilland from said energy adding means to said condensing chamber, and means for removing condensate from said condensing chamber.

7. Distillation apparatus comprising:

a plurality of tubes of a substantially equal length of from 4 to 7 feet and a diameter of from 2½ to 6 inches constituting evaporating chambers, each of said tubes having interior and exterior surfaces comprising a plurality of parallel protuberances separated by depressions, said protuberances being substantially parallel to the longitudinal axis of said tubes, a distilland distribution compartment positioned above the upper ends of said tubes, nozzle means for spraying with a downward velocity a separating chamber positioned below said evaporating chambers, means located in said separating chamber to separate evaporated distilland from unevaporated distilland, means for removing evaporated distilland from said separating chamber, means for removing unevaporated distilland from said separating chamber, a container forming a sealed chamber surrounding said tubes constituting a condensing chamber, means for admitting a supply of steam to said condensing chamber, and means for removing condensate from said condensing chamber.

References Cited by the Examiner

UNITED STATES PATENTS

| | | | |
|---|---|---|---|
| 40,662 | 11/1863 | Miller | 159—15 |
| 53,438 | 3/1866 | Gleason | 159—15 |
| 341,669 | 5/1886 | Lillie | 159—13 |
| 491,028 | 1/1893 | Thomas et al. | |
| 2,491,732 | 12/1949 | Hawkinson et al. | 202—64 X |
| 2,624,401 | 1/1953 | Schilt | 159—13 |
| 2,742,083 | 4/1956 | Henszey | 159—13 |
| 2,873,799 | 2/1959 | Earley et al. | 159—49 |
| 2,894,879 | 7/1959 | Hickman | 202—45 |
| 3,099,607 | 7/1963 | Lustenader et al. | 202—64 X |
| 3,101,258 | 8/1963 | Johnson | 159—3 X |
| 3,132,064 | 5/1964 | Scheffers | 159—13 X |

FOREIGN PATENTS

| | | |
|---|---|---|
| 205,057 | 3/1955 | Australia. |
| 12,502 | 1906 | Great Britain. |

NORMAN YUDKOFF, *Primary Examiner.*

F. E. DRUMMOND, M. S. SILVERSTEIN,
*Assistant Examiners.*